United States Patent [19]

Fiedler

[11] 3,773,970

[45] Nov. 20, 1973

[54] TELEPRINTER SUBSCRIBER STATION APPARATUS FOR SINGLE CURRENT OPERATION WITH BACK POTENTIAL AT THE SUBSCRIBER STATION

[75] Inventor: Helmut Fiedler, Geretsried, Germany

[73] Assignee: Siemens Aktiengesellschaft, Berlin and Munich, Germany

[22] Filed: July 20, 1971

[21] Appl. No.: 164,384

[30] Foreign Application Priority Data

July 29, 1970 Germany.................. P 20 37 660.7

[52] U.S. Cl. ........................................ 178/3, 178/79

[51] Int. Cl. ............................................ H04l 17/02

[58] Field of Search ...................... 178/2 R, 3, 4.1 R, 178/17 R, 68, 79, 89, 88 R; 179/16 F

[56] References Cited

UNITED STATES PATENTS

| | | | |
|---|---|---|---|
| 3,005,041 | 10/1961 | Sellers, Jr. | 178/4.1 R |
| 3,519,743 | 7/1970 | Herter | 178/4.1 R X |
| 2,577,444 | 12/1951 | Bliss | 178/68 |
| 3,411,021 | 11/1968 | Elich | 178/68 X |

FOREIGN PATENTS OR APPLICATIONS

| | | | |
|---|---|---|---|
| 1,234,780 | 2/1967 | Germany | 178/4.1 R |

*Primary Examiner*—Thomas W. Brown
*Attorney*—Harold J. Birch et al.

[57] ABSTRACT

In teleprinter subscriber station circuitry functioning according to the single current principle an auxiliary current source is described whereby a back potential is generated. The auxiliary current source can be connected to a subscriber input line over a controllable switch, which may be a transistor. The auxiliary current source is so connected at the beginning of a start step only for a period of time which is short relative to the duration of the start step. The switch may be controlled by a pulse generator.

4 Claims, 5 Drawing Figures

TELEPRINTER SUBSCRIBER STATION APPARATUS FOR SINGLE CURRENT OPERATION WITH BACK POTENTIAL AT THE SUBSCRIBER STATION

BACKGROUND OF THE INVENTION

The invention described herein relates to an arrangement for teleprinter subscriber stations functioning in single current operation and having an auxiliary current source for the generation of a back potential.

In the technology of teleprinting single current subscriber stations, which contain an auxiliary current source for increasing telegraphic transmission speeds over the transmission path between the subscriber station and the closest switching office are known and commonly used. An arrangement functioning according to this principle is, for example, described in the German Pat. No. 1,056,172. The basic idea underlying such arrangements using so-called back potential keying is that the energy necessary for the charging of the line capacity upon actuation of the transmission contact is not drawn exclusively from the exchange-or telegraph-battery of the conversion circuit in the exchange, but that in addition thereto there is a special current source at the subscriber station. An auxiliary current source present at every subscriber station delivers an equally large potential at least as long as the exchange battery, until the receiver relay in the conversion circuit in the exchange has shifted its armature to the position corresponding to an open transmission contact (signal position), and the transmission contact of the subscriber station connects the auxiliary current source to the subscriber input lead upon transmission of teleprinter signals, in synchronism with the individual telegraphic steps.

A schematic diagram of such a known back potential keying circuit is illustrated in FIG. 1. In the subscriber station TS, which contains a receiving magnet EM and a transmission contact sk, the potential Ug is available as auxiliary current source back potential. Subscriber station TS is connected over the line L with a conversion circuit US in the exchange, which is constructed in the usual manner. A receiver relay AE for the reception of single current signals sent from the subscriber station is provided. The first winding or relay AE is arranged in the conduction circuit and its second winding is arranged in the replication circuit. The single current signals sent by the subscriber station TS are forwarded over the contact ae of the receiver relay AE in the form of double current signals to a long distance, transmission line. Reception of double current signals arriving over the transmission line, which is not shown herein, is accomplished with the assistance of the transmission relay BS, whose contacts bs short circuit in the line L to the subscriber station in synchronism with incoming signals.

The advantages realizable with back potential keying are most clearly seen by observing the mode of operation of this circuit. Assuming that the receiver relay AE, as well as the transmission relay BS, are excited, i.e., the contacts ae and bs are in the illustrated separation position, then a current flows over the subscriber line L, over the following circuit: —TB, *bs*, b-wire, *sk*, EM, a-wire, RL, AEI, —TB. The second winding AEII is excited by the signal, but in the usual manner the excitation of the first winding AEI is about twice as great as the excitation over the replication circuit, so that the contact ae retains the assumed separation position. Transmission contact sk is actuated in order to transmit a start-step. Thereby, the back potential Ug generated by the auxiliary current source in the subscriber station TS is connected to the subscriber line L. Exciting of the line is accomplished almost exclusively by the auxiliary current source, so that the excitation circuit of the receiver relay AE loses current very rapidly upon opening of the transmission contact sk. The contact ae, therefore, is reversed practically without delay because of the excitation of the replication winding.

Circuitry constructed according to this principle offers substantial advantages over arrangements operating without back potential in the subscriber station, but it is necessary that the voltage values of the exchange battery and the auxiliary current source coincide very exactly. Variations in potential in the exchange and in the subscriber station cause potential differences which necessitate a more or less large residual current flowing over the line. The so-called isochronic distortions caused thereby exceed by far the maximum allowable total distortion for single current of ± 10 percent. This disadvantage may be compensated for only to a certain extent by adjusted exchange potentials and adjusted back potentials. Beyond that, the regulation of potentials leads to impractical expenses, especially in smaller exchanges.

It is therefore, an object of the invention to provide means for avoiding the foregoing disadvantages.

SUMMARY OF THE INVENTION

The solution offered by the invention is characterized by the fact that the auxiliary current source is connected to the subscriber line over a controllable switch, preferably a transistor, at the beginning of a start-step to be transmitted, and then only for a short time relative to the duration of a start-step. In this way, the energy necessary to achieve within a start-step the currentless but potential-carrying state in the line is provided solely by the subscriber station. As soon as sufficient energy is furnished to the subscriber line, the supply of energy is cut off, thus, preventing a residual current and avoiding the aforementioned distortions. The arrangement according to the invention offers the possibility, through appropriate choice of the duration of the impulse and the size of the back potential accompanying this pulse-duration, of choosing the optimal value of the energy supply for the particular line being used. The back potential is chosen to be larger than the potential of the exchange battery, including all voltage fluctuations.

BRIEF DESCRIPTION OF THE DRAWINGS

The invention will be best understood by reference to a description of preferred embodiments given hereinbelow in conjunction with the drawings in which.

Figures 1, 2, 3:
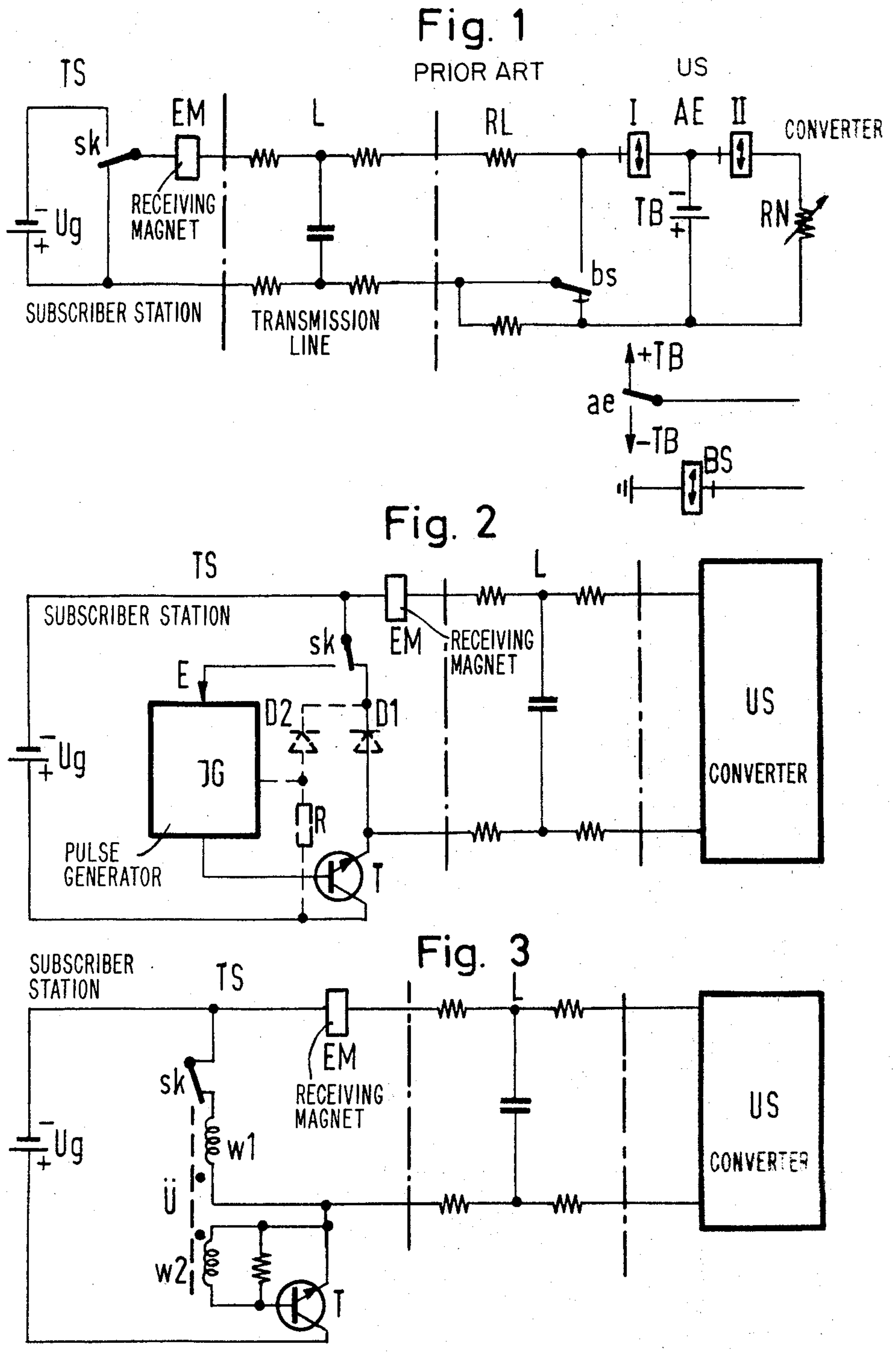
FIG. 1 is a schematic diagram of a prior art back potential keying circuit arrangement.
FIG. 2 is a schematic diagram of a first preferred embodiment of a subscriber station constructed according to the principles of the invention having a pulse generator controlled transistor switch for the auxiliary current source.
FIG. 3 is a schematic diagram of a second preferred embodiment of a subscriber station constructed according to the principles of the invention having a transformer controlled transistor switch for the auxiliary current source.

DETAILED DESCRIPTION OF THE PREFERRED EMBODIMENTS:

The circuitry shown in FIG. 2 includes a converter circuit US in an exchange, as described in FIG. 1, which is connected with the subscriber station TS over the line L. The converter circuit is known in the art and forms no part of the invention, so that it will not be described further. Within the subscriber station, the receiver magnet is again denoted EM, the transmission contact is denoted sk, and the back potential available from the auxiliary current source is denoted Ug. In accordance with the invention, the subscriber station TS contains further a pulse generator IG, and a controllable switch, which in this example is a transistor T. The pulse generator IG, which, for example, can be constructed in a well-known manner, can be triggered over an input end E to deliver a precisely defined pulse at its output. In the example under consideration, the transmission contact sk is designed as an alternating contact; that is, upon transmission of a start-step, begun by opening the transmission contact, the pulse generator is activated. Therewith, a controlling signal causing the transistor to conduct reaches its base over output A. The back potential Ug is present on the subscriber line L during the conducting state of the transistor T. In order to avoid designing the transmission contact sk as an alternating contact, it is also possible to activate the pulse generator IG over a direct connection with the subscriber line. This possibility has been represented in FIG. 2, with dashed lines. In this example, the pulse generator IG is prepared over the diode D2 in the closed condition of the transmission contact sk, or during a stop-step. As soon as the transmission contact sk is opened, a start-step is transmitted, the pulse generator IG is supplied with positive potential over a resistance R, and during a specified space of time a controlling signal conducting causing the transistor T to conduct is available over the output A. In both examples the energy which flows into the subscriber line L is determined by the duration of the pulse and the amount of back potential.

A further example, in which a transformer acts as the pulse generator, is given in FIG. 3. In this embodiment, a first winding w1 of the transformer U is connected in series with the transmission contact sk, while a second winding w2 is connected across the base-emitter circuit of the transistor T. When the transmission contact sk is closed, i.e., during transmission of a stop-step, the conduction current flows through the first winding of the transformer U. With the start of transmission of a start-step, the transmission contact sk is opened, and the flow of current in the first winding is interrupted. The energy stored in the transformer reaches the base of the transistor T in the form of a pulse of predetermined duration. The transistor, operating as a switch, applies the back potential Ug to the subscriber line L during its conducting state. The duration of the pulse can be adjusted through proportioning of the transformer. As soon as the magnetic energy is used up, the transistor T is again blocked, extinguishing the pulse.

Figure 4:
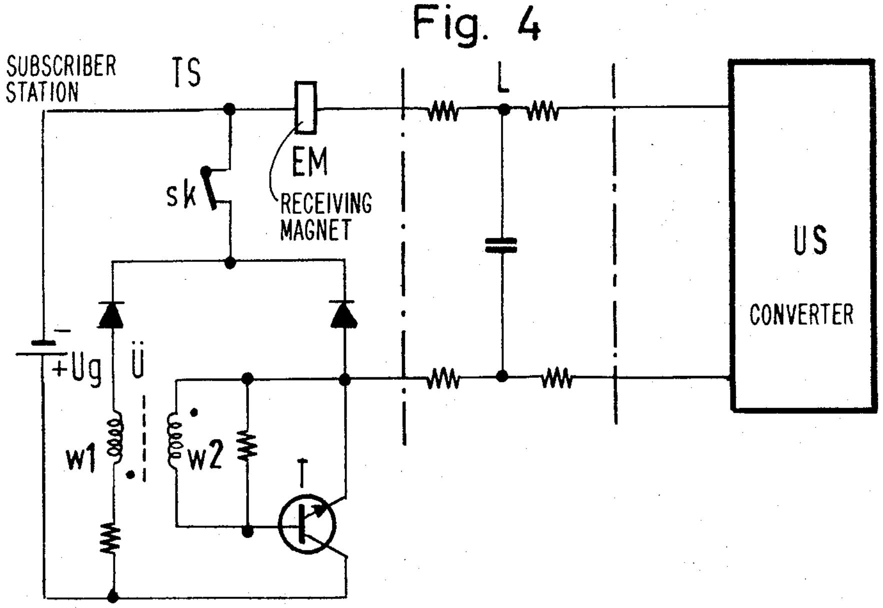
FIG. 4 is a schematic diagram of an alternative arrangement for the FIG. 3 embodiment and FIG. 5 is a schematic diagram of a third preferred embodiment of a subscriber station constructed according to the principles of this invention.

In order to avoid the disadvantage associated with this circuit, which is caused by the use of inductances in the subscriber line, a separation of the circuits can be achieved by connecting diodes, as shown in FIG. 4. In both cases the sense of winding of the transformer windings is such that the pulse induced through opening the transmission contact *sk* in the secondary circuit of the transformer is available as a controlling signal causing the transistor T to conduct.

Figure 5:
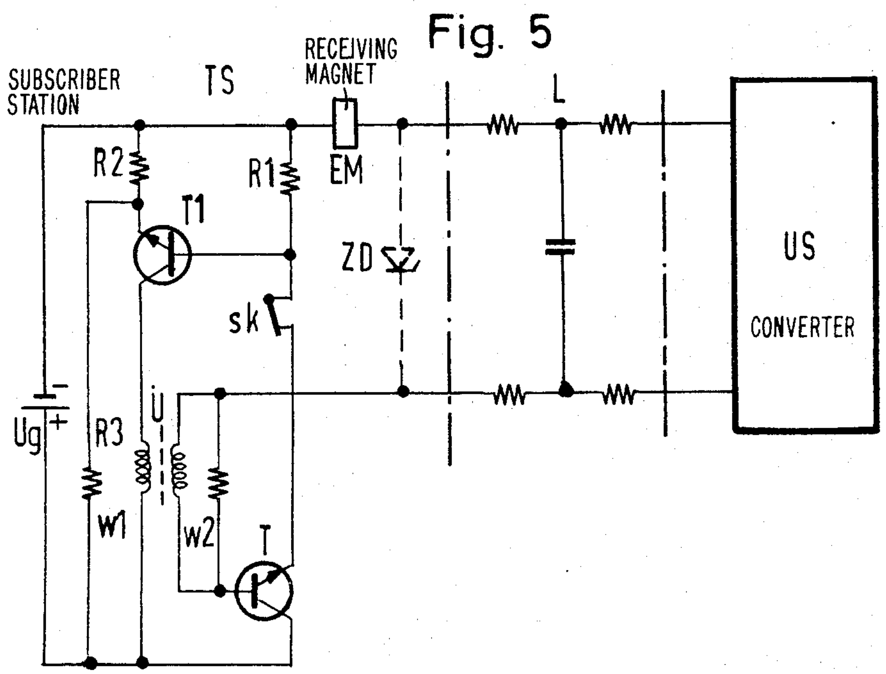

It has already been mentioned that there exists a relationship between the duration of a pulse and the size of the back potential applied to the subscriber line during the duration of the pulse, insofar as the duration of the pulse is shortened with increasing back potential and decreasing exchange potential, and vice versa. A circuit arrangement which utilizes this relationship is shown in FIG. 5. The subscriber station TS contains again, a transformer, over the second winding w2 of which the transistor T can be controlled, and over which the back potential Ug arrives at the subscriber line.

The first winding w1 of the transformer lies, in this example, in the collector circuit of a second transistor T1, at the base of which a potential proportional to the exchange potential (± TB in US) and at the emitter of which a potential proportional to the back potential is applied. The potential proportional to the exchange potential is generated over a resistance R1 through which the conduction current flows. The potential proportional to the back potential is formed over the resistances R3 and R2. The resistances are so proportioned that the transistor T1 is in the conduction-state when the transmission contact sk is closed. The collector current of the transistor T1 flowing in this state is thus a function of the exchange — and back potentials. Therefore, the energy stored in the transformer Ue is also a function of these two potentials. Upon opening the transmission contact sk and the resultant transmission of a start-step, the transistor T1 is diverted into its blocked state, and the energy stored in the transformer Ue generates a pulse of specified length which directs the transistor T into its conduction state. As described, during this period of time the back potential Ug is connected to the subscriber line L.

With an arrangement constructed according to the principles of this invention, the back potential is connected to the subscriber line only during a short period of time relative to the duration of the start-step. Hence, the further advantage that the back potential can be regulated with little difficulty is obtained. This regulation may be accomplished with a Zener diode, as shown in FIG. 5 by dashed lines.

The various embodiments of the invention described hereinabove are intended only to be exemplary of the principles of the invention, and in no way limiting as to its scope. The scope of the invention is defined by the appended claims.

I claim:

1. Apparatus for a teleprinter subscriber station using single current operation and having an auxiliary current source for generating a back potential upon transmission of a start step, comprising:

a subscriber line, first switching means for connecting said auxiliary current source to said subscriber line, and means for operating said switching means to connect said auxiliary current source to said subscriber line at the beginning of a start-step and for a period of time which is short relative to the duration of said start-step.

2. The apparatus defined by claim 1, wherein said means for operating comprises a pulse generator, said subscriber station including a transmission contact constructed to operate as an alternating contact, said transmission contact connected to trigger said pulse generator.

3. The apparatus defined in claim 1 wherein said subscriber station includes a transmission contact, said switching means includes a control circuit and wherein said means for operating comprises:

a first inductive winding connected in series with said transmission contact, conduction current thereby flowing through said first winding, a second inductive winding magnetically coupled to said first winding and connected to said control circuit of said switching means for controlling the operation thereof, the polar relationship of said windings being such that a signal actuating said switching means is available at the beginning of a start-step.

4. The apparatus defined in claim 3 further comprising:

a first resistance connected in series with said transmission contact and through which conduction current flows, a second resistance connected across said auxiliary source and conducing current therefrom, and second switching means having a conduction path connected to operate in dependence on the voltages across said first and second resistances, said first winding being connected in the conduction path of said second switching means.

* * * * *